United States Patent

Futamura

[11] Patent Number: 5,951,884
[45] Date of Patent: Sep. 14, 1999

[54] ELECTRIC DISCHARGE MACHINING METHOD AND APPARATUS

[75] Inventor: Shoji Futamura, Kanagawa-ken, Japan

[73] Assignee: Institute of Technology Precision Electrical Discharge Work's, Kanagawa-Ken, Japan

[21] Appl. No.: 08/801,701

[22] Filed: Feb. 14, 1997

[30] Foreign Application Priority Data

Feb. 19, 1996 [JP] Japan ........................ 8-030248

[51] Int. Cl.⁶ .................. B23H 1/00; B23H 9/10
[52] U.S. Cl. ......................... 219/69.2; 219/69.17
[58] Field of Search ............. 219/69.11, 69.14, 219/69.15, 69.17, 69.2; 204/224 M; 205/649

[56] References Cited

U.S. PATENT DOCUMENTS

| | | | |
|---|---|---|---|
| 2,778,925 | 1/1957 | Gross et al. | 219/69.15 |
| 2,909,640 | 10/1959 | Fairbrother | 219/69.15 |
| 3,156,808 | 11/1964 | Davies et al. | 219/69.2 |
| 3,801,770 | 4/1974 | O'Connor | 219/69.2 |
| 3,920,947 | 11/1975 | Wachtell | 219/69.17 |
| 4,052,284 | 10/1977 | Schrader | 204/224 M |
| 4,159,407 | 6/1979 | Wilkinson et al. | |
| 4,167,462 | 9/1979 | Schrader et al. | 204/224 M |
| 4,670,635 | 6/1987 | Johnson et al. | 219/69.15 |
| 4,995,949 | 2/1991 | Rhoades | 219/69.17 |

FOREIGN PATENT DOCUMENTS

| | | |
|---|---|---|
| 35 33 957 A1 | 4/1986 | Germany. |
| 39 11 362 A1 | 10/1990 | Germany. |
| 1284753 A1 | 1/1987 | U.S.S.R.. |
| 1028247 | 3/1963 | United Kingdom. |
| 981993 | 2/1965 | United Kingdom. |

Primary Examiner—Geoffrey S. Evans
Attorney, Agent, or Firm—McGlew and Tuttle, P.C.

[57] ABSTRACT

A method and apparatus for electric discharge machining the front and rear surfaces of a workpiece having thin-walled parts by using electrodes, in which the front and rear surfaces of a workpiece are discharge machined simultaneously by securing a workpiece in position on a movably adapted table, supporting two electrodes having surfaces corresponding to the front and rear surfaces being machined of the workpiece in such a manner as to face the surfaces being machined of the workpiece in such a manner and as to be retractable with respect to the surfaces being machined of the workpiece, and controlling the two electrodes so that the two electrodes are brought close to the workpiece in synchronism with each other at substantially the same traveling rate per unit time.

9 Claims, 5 Drawing Sheets

ELECTRIC DISCHARGE MACHINING METHOD AND APPARATUS

BACKGROUND OF THE INVENTION AND RELATED ART STATEMENT

This invention relates to an electric discharge machining method and apparatus for machining the longitudinal surfaces of a workpiece having thin-walled parts, like turbine blades.

Electric discharge machining has heretofore been used for machining workpieces having complex shapes because it is capable of forming hard materials of poor machinability into the same shape as that of electrodes. It has the advantage of being capable of high-precision machining.

FIG. 1 is a diagram of assistance in explaining the construction of typical electric discharge machining apparatus of a conventional type. In FIG. 1, numeral 51 refers to a bed, at the edge of which a column 52 is provided. A feed mechanism 53 provided at the upper end of the column 53 causes a holder 55 holding an electrode 54 to be disposed in a vertically movable manner. On the bed 51 provided is a machining tank 57 containing a working liquid 56, in which a workpiece 58 is placed. With the electrode 54 and the workpiece 58 connected to a power source (not shown), the electrode 54 is caused to lower by the feed mechanism 53 so that electric discharge is generated between the electrode 54 and the workpiece 58 in the working liquid 56 to form holes, recesses and other shapes in the workpiece 58.

FIG. 2A is a front view showing an example of a turbine blade as a workpiece; FIGS. 2B and 2C being cross-sectional views taken along lines A—A and B—B in FIG. 2A, respectively. In FIGS. 2A through 2C, a turbine blade 60 comprises a base 61 which is mounted on a turbine shaft, and a vane 62 which is formed into a broad, thin-walled section, whose side surfaces 64 and 65 along the major axis 63 have complex curvatures as shown in FIGS. 2B and 2C.

Since turbine blades 60 as shown in FIGS. 2A through 2C are usually made of a hard material, such as SUS630, for example, and their vanes 62 are formed into thin-walled sections, it is extremely difficult to machine their side surfaces 64 and 65.

Workpieces of hard materials such as mentioned above are normally formed by electrolytic machining. That is, with a turbine blade 60 being machined used as an anode and a cathode, both immersed in an alkaline electrolytic solution, like NaOH, a direct current is applied to effect electrolysis to remove the metal of the turbine blade 60. In such a case, electrolytic machining is carried out by injecting the electrolyte under high pressure to prevent metallic ions from adhering on the cathode. Since the cathodic electrode is hardly consumed, the turbine blade 60 as a workpiece can be formed into the exact contour of the electrode. Furthermore, heat or external force never affects the workpiece, producing no degraded layers on the surface of the workpiece.

Electrolytic machining, however, has a difficulty in determining the contour of the electrode. In electrolytic machining where machining is effected with a jet stream of electrolytic solution, the flow of electrolytic solution tends to be changed by the initial shape of the workpiece, making it difficult to maintain machining accuracy. To overcome this, the shape of electrode has to be determined through a process of several or several dozens of trials and errors. For this reason, electrolytic machining is suitable for long-run mass production of uniform products, but not suitable for short-run production of variations in sizes and grades.

Electric discharge machining, on the other hand, can produce a workpiece that is 100–200 $\mu$m smaller than the electrode at any portions facing the electrode. An effective means for discharge machining a workpiece, such as a turbine blade 60, into a predetermined shape is to use electrodes having surfaces corresponding to the blade surfaces 64 and 65.

It is necessary, however, to remove minute cracks on the discharge-machined surfaces after machining. An effective means to remove such cracks is to carry out electrolytic machining or electrolytic grinding by flowing electrolytic solution on the machined workpiece after discharge machining, with the electrode disposed close to the workpiece.

During electric discharge machining, however, heat is generated on the surface of the workpiece due to discharge between the electrode and the workpiece, causing the surface of the workpiece to expand in the direction along the surface. When the side surfaces 64 and 65 of the turbine blade 60 as shown in FIGS. 2A through 2C are discharge machined separately, the surface of the turbine blade 60 tends to expand in the direction along the side surfaces 64 and 65, or in the direction along the major axis 63, causing the vane 62 to warp due to the small wall thickness of the vane 62, leading to lowered dimensional accuracy. The larger the size of the major axis 63 of the turbine blade 60 and the smaller the wall thickness of the vane 62, the more pronounced becomes this tendency.

SUMMARY OF THE INVENTION

This invention is intended to solve the problems inherent in the prior art. It is an object of this invention to provide an electric discharge machining method and apparatus that can discharge machine the surfaces along the major axis of a workpiece having thin-walled portions with high accuracy while preventing the workpiece from being unwantedly deformed.

To achieve these objectives, an electric discharge machining method and apparatus for electric discharge machining the front and rear surfaces of a workpiece having thin-walled portions via electrodes according to this invention have such a construction that the surfaces of the workpiece are discharge machined simultaneously by securing the workpiece in position on a movably adapted table, supporting two electrodes having surfaces corresponding to the surfaces being machined of the workpiece in such a manner as to face the surfaces being machined of the workpiece and as to be retractable with respect to the surfaces being machined of the workpiece, and controlling the two electrodes so that the two electrodes are brought close to the workpiece in synchronism with each other at substantially the same travelling rate per unit time.

Furthermore, an electric discharge machining method and apparatus for electric discharge machining the front and rear surfaces of a workpiece having thin-walled portions via electrodes according to this invention have such a construction that a workpiece positioning means provided on a movably adapted table for securing the workpiece in position, an electrode supporting means for supporting two electrodes having surfaces corresponding to the surfaces being machined of the workpiece in such a manner as to face the surfaces being machined of the workpiece and as to be retractable with respect to the surfaces being machined of the workpiece, and an electrode travel control means for effecting control so that the two electrodes are brought close to the workpiece in synchronism with each other at substantially the same travel rate per unit time to enable the simultaneous machining of the surfaces being machined of the workpiece are provided.

With the aforementioned construction, electric discharge machining can be effected with high precision while preventing the workpiece from being deformed due to heat produced during electric discharge machining.

DETAILED DESCRIPTION OF THE EMBODIMENTS

Figure 2A:
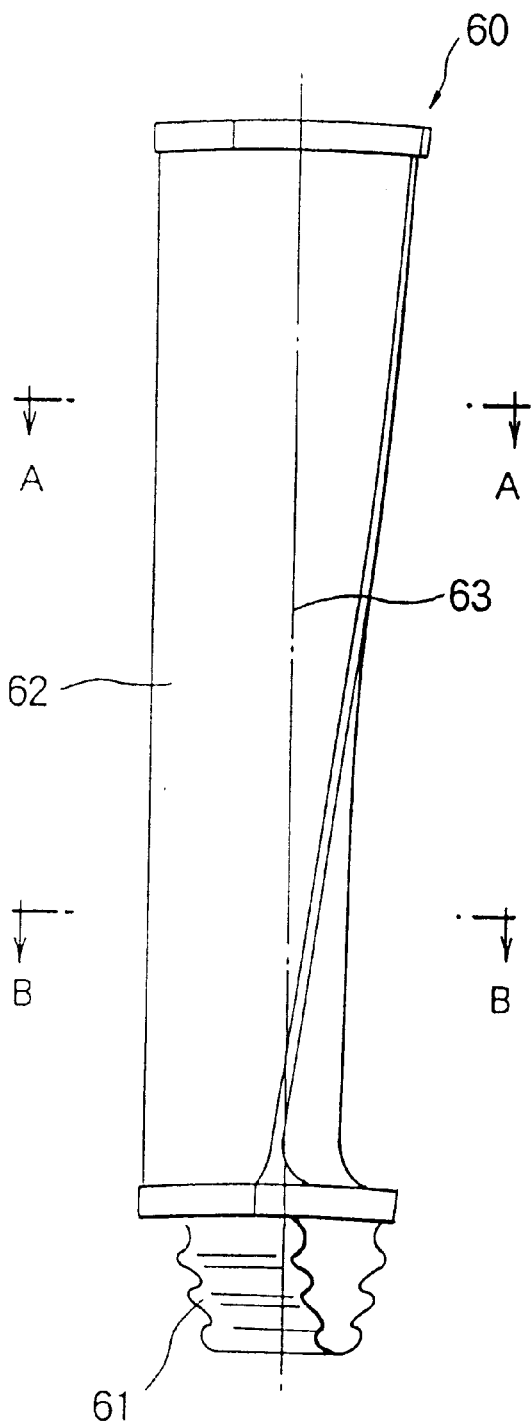
FIG. 2A is a front view of an example of turbine blade as a workpiece.
Figure 2B:
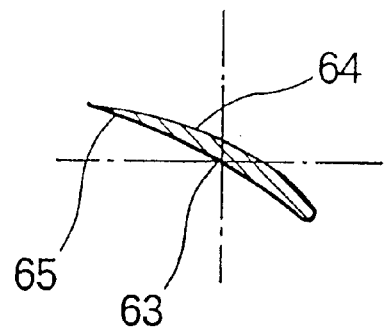
FIGS. 2B and 2C are cross-sectional views taken along lines A—A and B—B in FIG. 2A, respectively.
Figure 2C:
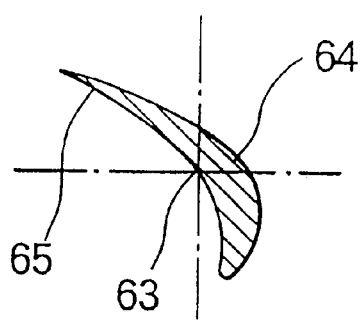
Figure 3:
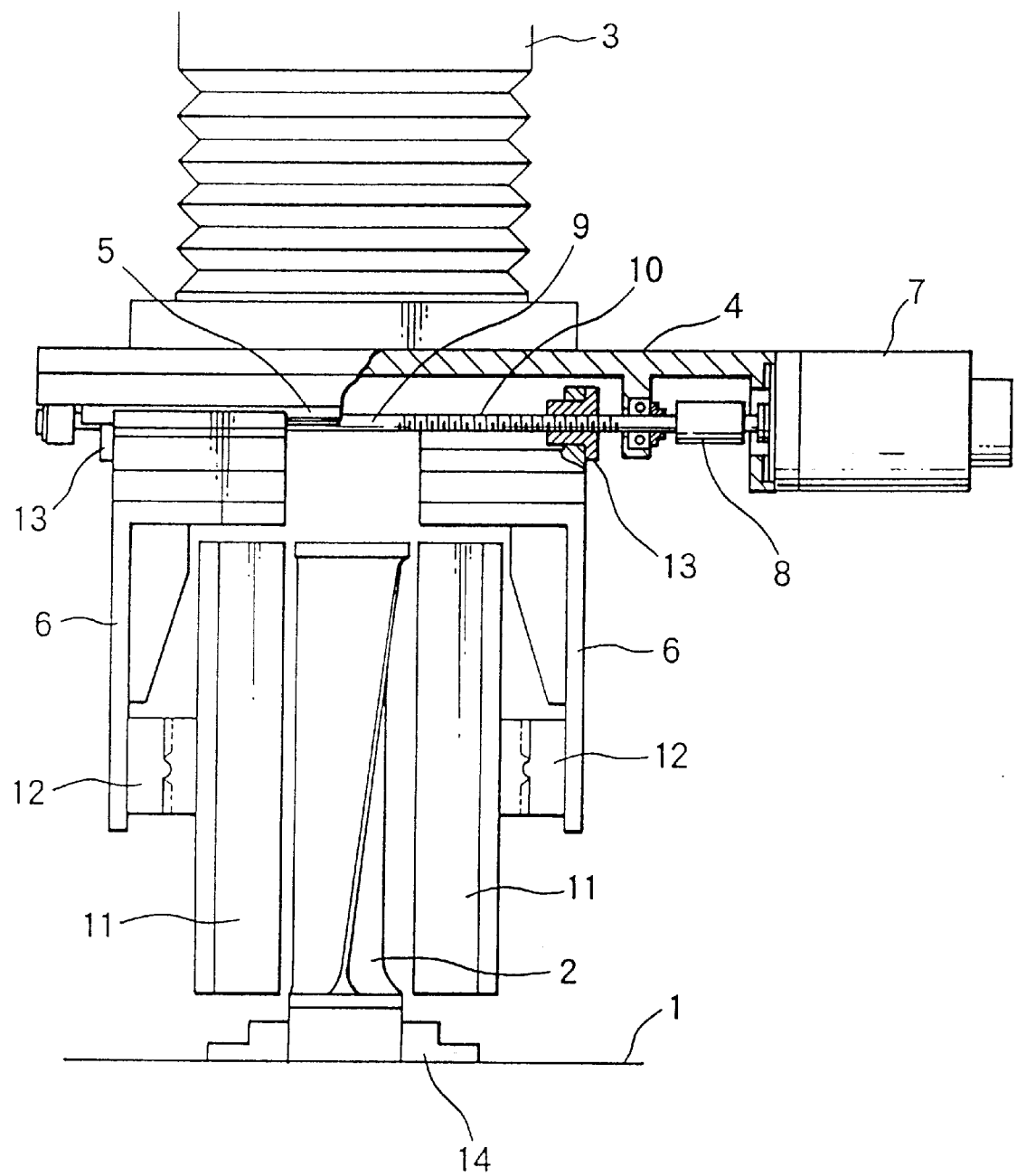
FIGS. 3 and 4 are partially cross-sectional front and side views of an embodiment of this invention, respectively.
Figure 4:
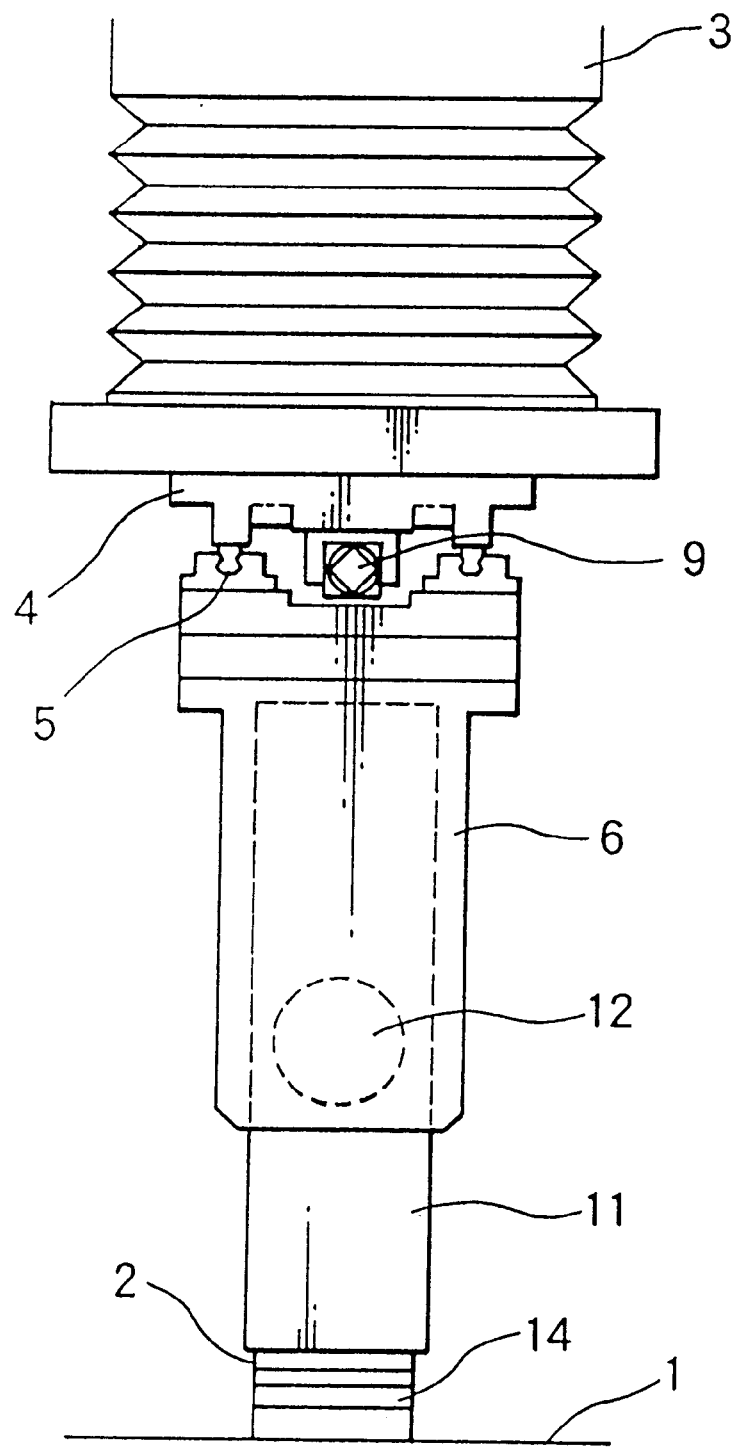

FIGS. 3 and 4 are partially cross-sectional front and side views of an embodiment of this invention. In FIGS. 3 and 4, numeral 1 refers to a table provided on a bed constituting an electric discharge machining apparatus according to this invention in such a manner as to be movable horizontally (in the XY direction, for example). A long, thin-walled workpiece 2 as shown in FIG. 2 is secured in position on the table 1 via a mounting jig 14, for example, so that the major axis stands upright.

Figure 1:
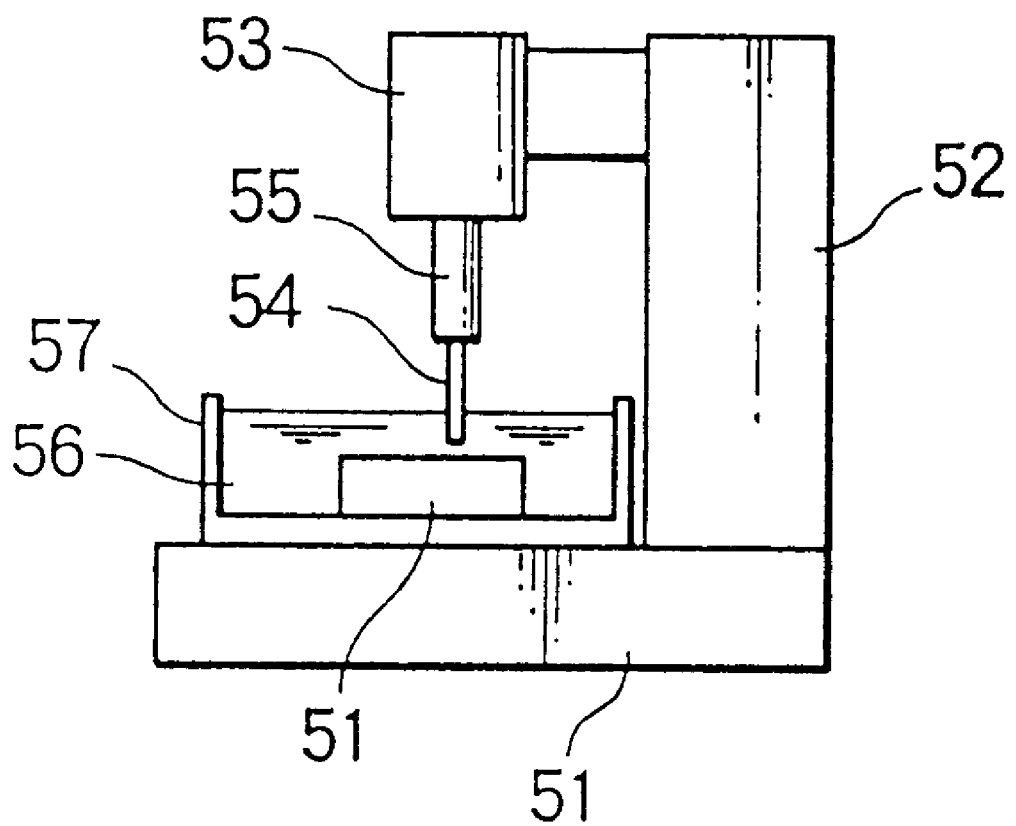
FIG. 1 is a diagram of assistance in explaining the construction of a typical electric discharge machining apparatus of a conventional type.

Numeral 3 refers to a head disposed via a column 52 as shown in FIG. 1 in such a manner as to face the table 1 and as to be vertically movable. Numeral 4 refers to a support member fixedly fitted to the lower part of the head 3 for supporting two electrode holders 6 via a guide 5 in a horizontally movable manner. A servo motor 7 is fixedly fitted to an end of the support member 4, with the output shaft thereof connected to a feed shaft 9 via a coupler 8. On the feed shaft 9 provided are right-hand and left-hand feed threads 10 having the same pitch from the central part thereof towards both ends thereof.

Numeral 11 is an electrode formed in such a fashion to have surfaces corresponding to the side surfaces of the workpiece 2, and fixedly fitted to the electrode holder 6 via a positioning member 12. Two electrodes 11 and 11 are connected to a power source so that a voltage of the same high-frequency pulse power source can be applied. Numeral 13 refers to a female-threaded member fixedly fitted to the electrode holder 6 and enmeshed with the feed thread 10.

With the aforementioned construction, the workpiece 2 is secured in position on the table 1, as described earlier, the position of the table 1 is adjusted so that the electrodes 11 and 11 are located at an equal distance from the workpiece 2, and the head 3 is lowered and held in the state shown in FIG. 3 to position the table 1 and the head 3. Next, the servo motor 7 is driven via a control device (not shown), and a voltage of a high-frequency pulse power source is applied to the electrodes 11 and 11 to discharge machine the workpiece 2.

In this state, as the feed shaft 9 is driven by the servo motor 7, the electrode holders 6 and 6 are caused to travel in synchronism with each other at substantially the same travel rate per unit time via the female-threaded members 13 enmeshed with the right-hand and left-hand feed threads 10 of the same pitch provided on the feed shaft 9. As a result, the electrodes 11 and 11 are brought close to the workpiece 2 in synchronism with each other, machining almost the same amount of metal on both side surfaces of the workpiece 2 simultaneously.

During the aforementioned electric discharge machining, heat is generated on both side surfaces of the workpiece 2, but the thermal energy supplied to both side surfaces of the workpiece 2 is kept almost uniform because both side surfaces of the workpiece 2 are machined by almost the same amount, maintaining the straightness of the major axis of the workpiece 2. Thus, high-precision discharge machining can be accomplished without warp.

Figure 5:
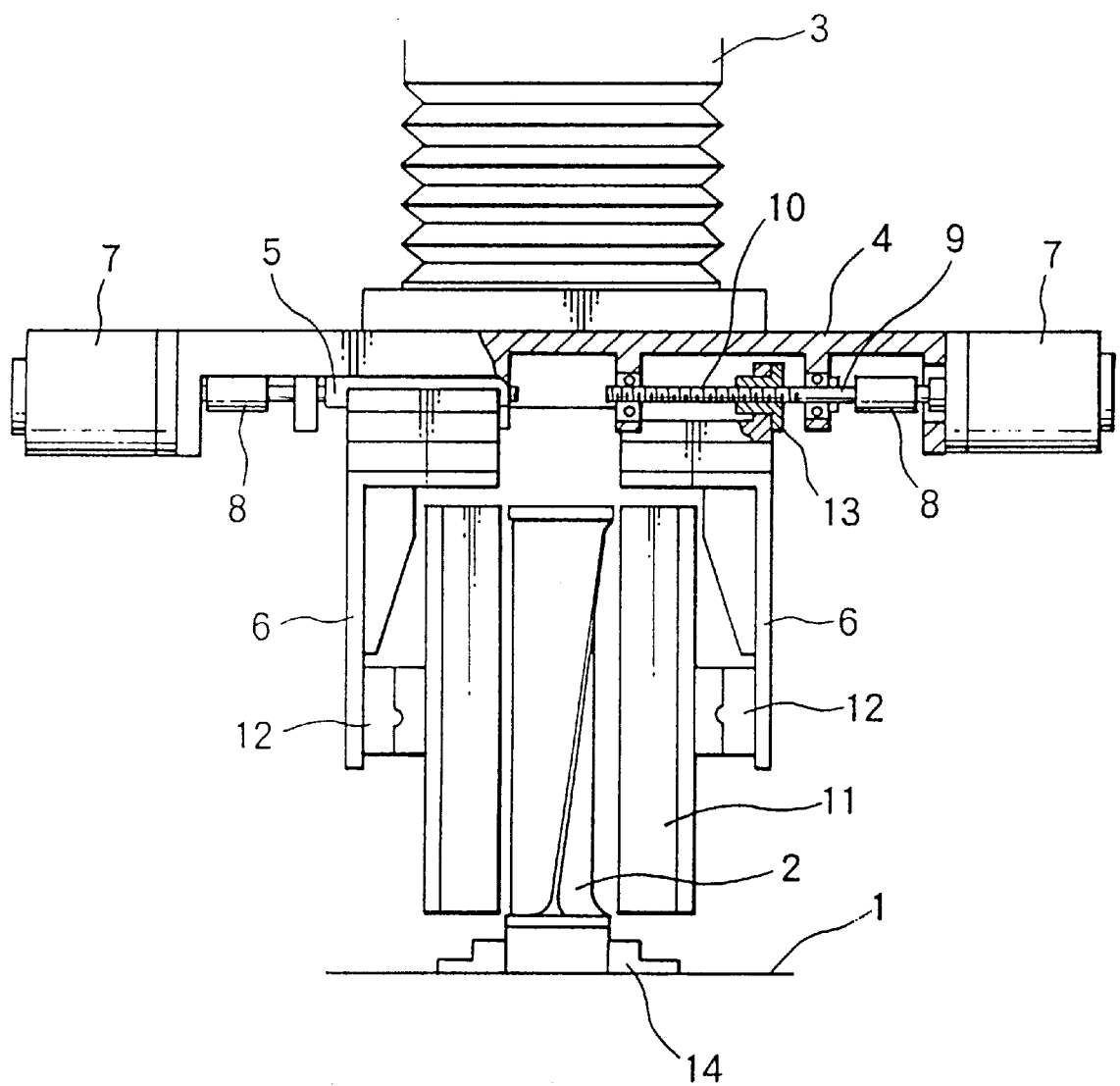
FIG. 5 is a partially cross-sectional front view of another embodiment of this invention.

FIG. 5 is a partially cross-sectional front view of another embodiment of this invention. Like parts are indicated by like numerals used in FIGS. 3 and 4. In FIG. 5, two independent feed shafts 9 are disposed facing each other in such a manner that the respective axis lines are aligned or parallel with each other so that the feed shafts 9 can be driven by independent servo motors 7 via couplers 8. The two servo motors 7 and 7 are driven in synchronism with each other via a control device (not shown) to cause the electrode holders 6 and 6 to travel at the same rate per unit time.

With the aforementioned construction, the electrodes 11 and 11 are brought close to the workpiece 2 in synchronism with each other, machining both side surfaces of the workpiece 2 simultaneously by substantially the same amount, leading to high-precision discharge machining.

In the above embodiment, description has been made on an electrode travel control means comprising a servo motor. However, this may be replaced with a hydraulic servo mechanism. In short, the electrode travel control means may have such a construction that the two electrodes 11 and 11 are brought close to the workpiece 2 in synchronism with each other and at substantially the same travel rate per unit time.

Furthermore, the above embodiment shows a means for supporting the workpiece 2 in such a manner that the workpiece 2 is made vertical in the longitudinal direction and that the electrodes 11 and 11 are movable in the direction parallel with the horizontal plane. The workpiece 2 may be supported in such a manner that the longitudinal direction thereof is made substantially horizontal and that the electrode 11 and 11 are movable in the direction parallel with the vertical plane.

As to the machinability of the electric discharge machining apparatus according to this invention, a workpiece 2 having a curved cross-sectional contour, such as a turbine blade, and/or having a longitudinal size larger than the cross-sectional size can be machined particularly effectively. However, those workpieces 2 having a smaller longitudinal size, or having a thin-walled portion on part of the cross-sectional contour, can also be machined satisfactorily with the electric discharge machining apparatus of this invention.

This invention having the aforementioned construction and operation can accomplish the discharge machining of the surfaces being machined of a workpiece having a thin-walled portion, such as a turbine blade, with high precision and efficiency and without warp and bend.

What is claimed is:

1. An electric discharge machining method, comprising the steps of: simultaneously discharge machining a front, broad, major surface and a rear, broad, major surface of an elongate workpiece via electrodes, said front surface having cross-sectional contours which are different from cross-sectional contours of said rear surface, said cross-sectional contours of said workpiece being different at different longitudinal positions, said workpiece having a thin-walled portion bounded by said front surface and said rear surface, said simultaneous discharge machining via electrodes including securing said workpiece in position on a movably adapted table, disposing a front surface electrode facing said front surface and disposing a rear surface electrode facing said rear surface, said front surface electrode having a surface corresponding to said front surface being machined and said rear surface electrode having a surface corresponding to said rear surface being machined, said front surface electrode and said rear surface electrode being disposed in such a manner as to be retractable with respect to said surfaces being machined, and effecting control so that said electrodes are brought close to said surfaces being machined in synchronism with each other and at substantially the same travel rate per unit time.

2. The electric discharge machining method as set forth in claim 1, wherein said workpiece is supported on said table in such a manner as to make said workpiece substantially vertical in a longitudinal direction, and said electrodes are adapted to be movable in a direction parallel with the horizontal plane.

3. The electric discharge machining method as set forth in claim 1, wherein at least part of the cross-sectional contour of said workpiece is formed by a curve.

4. An electric discharge machining apparatus for discharge machining front and rear, broad, major surfaces of an elongate workpiece, via electrodes having a thin-walled portion bounded by said front surface and said rear surface said front surface having cross-sectional contours which are different from cross-sectional contours of said rear surface, said cross-sectional contours of said workpiece being different at different longitudinal positions, the apparatus comprising:

a workpiece positioning means provided on a movably adapted table for securing the workpiece in position on said table;

a front surface electrode and a rear surface electrode having surfaces corresponding to said workpiece front and rear surfaces being machined respectively, so that said front surface has a cross-sectional contour different from said rear surface and said cross-sectional contours of said electrodes being different at different longitudinal positions;

an electrode support means for supporting said front surface electrode facing said workpiece front surface and said rear surface electrode facing said workpiece rear surface, and in such a manner that said front surface electrode and said rear surface electrode are retractable with respect to said workpiece surfaces being machined; and an electrode travel control means for effecting control so that said two electrodes are brought close to said workpiece in synchronism with each other and at substantially the same travel rate per unit time, and that said workpiece surfaces being machined are machined simultaneously.

5. The electric discharge machining apparatus as set forth in claim 4 wherein a top surface of said table is made substantially horizontal, and said electrode support means comprises a support member provided above said workpiece and formed in such a manner as to be horizontally movable, and electrode holders adapted to be horizontally movable.

6. The electric discharge machining apparatus as set forth in claim 5, wherein said electrodes are mounted on said electrode holders via positioning members adapted to vertically and horizontally movable and adjustable.

7. The electric discharge machining apparatus as set forth in claim 5, wherein said electrode travel control means has right-hand and left-hand male threads of the same pitch each provided from the central part towards both ends thereof, and comprises a feed shaft adapted to be rotatable in forward and backward directions, and female-threaded members fixedly fitted to said electrode holders and having female-threads enmeshed with said male threads.

8. The electric discharge machining apparatus as set forth in claim 5, wherein said electrode travel control means comprises two independent feed shafts having male threads, provided in such a manner that the respective axial lines thereof are aligned or parallel with each other and adapted to be rotatable in forward and backward directions, two independent drive means for driving said feed shafts, and female-threaded members fixedly fitted to said electrode holders and having female threads enmeshed with said male threads.

9. An electric discharge machining method for small batch production of turbine blades of hard material, comprising the steps of: simultaneously discharge machining a front, broad, major surface and a rear, broad, major surface of an elongate workpiece via electrodes, said front surface having cross-sectional contours which are different from cross-sectional contours of said rear surface said cross-sectional contours of said workpiece being different at different longitudinal positions, said workpiece having a thin-walled portion bounded by said front surface and said rear surface, said simultaneous discharge machining via electrodes including securing said workpiece in position on a movably adapted table, disposing a front surface electrode facing said front surface and disposing a rear surface electrode facing said rear surface, said front surface electrode having a surface corresponding to said front surface being machined and said rear surface electrode having a surface corresponding to said rear surface being machined, said front surface electrode and said rear surface electrode being disposed in such a manner as to be retractable with respect to said surfaces being machined, and effecting control so that said electrodes are brought close to said surfaces being machined in synchronism with each other and at substantially the same travel rate per unit time.

\* \* \* \* \*